(12) United States Patent
Hattori

(10) Patent No.: US 7,404,767 B2
(45) Date of Patent: Jul. 29, 2008

(54) GAMING MACHINE HAVING A MAIN DISPLAY AND A MAGNIFIED SUB DISPLAY

(75) Inventor: Takanori Hattori, Tokyo (JP)

(73) Assignee: Aruze Corporation, Tokyo (JP)

(*) Notice: Subject to any disclaimer, the term of this patent is extended or adjusted under 35 U.S.C. 154(b) by 279 days.

(21) Appl. No.: 10/981,454

(22) Filed: Nov. 5, 2004

(65) Prior Publication Data

US 2005/0101366 A1    May 12, 2005

(30) Foreign Application Priority Data

Nov. 10, 2003  (JP) ............................. 2003-380378

(51) Int. Cl.
*A63F 13/00*  (2006.01)
(52) U.S. Cl. .......................... 463/31; 463/53
(58) Field of Classification Search ............. 463/30–34, 463/49–57
See application file for complete search history.

(56) References Cited

U.S. PATENT DOCUMENTS

| 5,775,993 | A   | 7/1998 | Fentz et al. |
| 6,373,464 | B1* | 4/2002 | Raviv et al. ................. 345/156 |
| 6,572,476 | B2* | 6/2003 | Shoji et al. .................... 463/33 |
| 2002/0094853 | A1* | 7/2002 | Hayashi ......................... 463/6 |
| 2003/0186741 | A1* | 10/2003 | Hayashida et al. ............ 463/31 |
| 2005/0101382 | A1* | 5/2005 | Hattori ......................... 463/36 |

FOREIGN PATENT DOCUMENTS

| CN | 1301583 |      | 7/2001 |
| EP | 1 147 794 | A2 | 10/2001 |
| EP | 1 147 794 | A3 | 1/2003 |
| JP | 07-181934 |    | 7/1995 |
| JP | 2000-58 |    | 7/2000 |
| JP | 2000-259854 |    | 9/2000 |
| JP | 2001-286678 |    | 10/2001 |

* cited by examiner

*Primary Examiner*—Scott E Jones
(74) *Attorney, Agent, or Firm*—Oliff & Berridge, PLC

(57) ABSTRACT

The gaming machine is constituted of a main body including a main display on which a game image is displayed and a sub display on which a portion of the game image is displayed in an enlarged manner, an aiming controller being configured to be movable over the main display and indicating an aiming position on the game image displayed on the main display, first display control means performing a display control of the game image on the main display, aiming position detection means detecting the aiming position on the game image indicated by the aiming controller, and second display control means performing an enlarged display control of a portion of the game image on the sub display such that the portion of the game image includes the aiming position detected by the aiming position detection means.

6 Claims, 9 Drawing Sheets

GAMING MACHINE HAVING A MAIN DISPLAY AND A MAGNIFIED SUB DISPLAY

CROSS-REFERENCES TO THE RELATED APPLICATIONS

This application is based upon and claims the priority from a prior Japanese patent application No. 2003-380378, filed on Nov. 10, 2003, in Japan, entire contents of which are incorporated herein by reference.

This application is related to a co-pending U.S. patent application referred to as a prior Japanese patent application No. 2003-380379 filed in Japan on Nov. 10, 2003.

BACKGROUND OF THE INVENTION

1. Field of the Invention

The present invention relates to a gaming machine such as a gaming machine for business use, a gaming machine for home use, for example.

2. Related Art

Conventionally, among various gaming machines, there has been known a gaming machine which increases display magnifications of a specific area in a game image displayed on a display and displays the magnified specific area on a portion of the display by manipulating a controller (see Japanese Laid-open patent publication 2001-286678 (patent document 1)). According to the gaming machine described in the patent document 1, a player arbitrarily can point out an area which he/she wants to watch and can increase the display magnifications of the area and hence, the player can reflect his/her will on a displayed content of the game image whereby it is possible to provide vivid effects to the player in a shooting game or the like.

Further, there has been also known a gaming machine which includes binoculars incorporating a display capable of displaying a game image therein and allows a player to advance a game by manipulating buttons or the like mounted on the binoculars while watching the game image (see Japanese Laid-open utility model publication 2000-58 (patent document 2) and Japanese Laid-open patent publication 2000-259854 (patent document 3)). According to the gaming machines disclosed in these patent documents 2, 3, it is possible to provide a unique game in which the player can perform the game while watching the binoculars.

SUMMARY OF THE INVENTION

However, with respect to the gaming machine described in the patent document 1, both of a usual game image and an image of the specific area whose display magnifications are increased are displayed on a single display. Accordingly, the gaming machine has a drawback that the display method of the game image lacks fun and reality and, at the same time, the ways of watching the game image become monotonous and hence, the gaming machine lacks interest. Further, also with respect to the gaming machines described in the patent documents 2, 3, a game image is always displayed only on a display in the inside of the binoculars and hence, the player must always look into the binoculars whereby the way of watching the game image becomes monotonous thus giving rise to a drawback that the gaming machine lacks interest. Further, to impose the player to always watch the binoculars makes the player become bored and tired with the game.

The present invention has been made in view of the above-mentioned drawbacks and it is an object of the present invention to provide a gaming machine which makes a player have high interest by diversifying the player's ways of watching game images.

To achieve the above-mentioned object, the present invention provides the following constitution.

(1) According to the present invention, there is provided a gaming machine comprising a main body (for example, a main body 11) including a main display (for example, a main display 12) on which a game image is displayed and a sub display (for example, a sub display 22) on which a portion of the game image is displayed in an enlarged manner, an aiming controller (for example, an aiming controller 20) being configured to be movable over the main display and indicating an aiming position on the game image displayed on the main display, first display control means performing a display control of the game image on the main display, aiming position detection means detecting the aiming position on the game image indicated by the aiming controller, and second display control means performing an enlarged display control of a portion of the game image on the sub display such that the portion of the game image includes the aiming position detected by the aiming position detection means (see FIG. 1).

Further, the present invention provides the following constitutions.

(2) A gaming machine having the above-mentioned constitution (1) is also characterized in that the main display (for example, a main display 12) is arranged in a horizontal posture.

(3) A gaming machine having the above-mentioned constitution (1) is also characterized in that the aiming controller (for example, an aiming controller 20) is constituted as a magnifying glass.

(4) A gaming machine having the above-mentioned constitution (1) is also characterized in that the second display control means performs the enlarged display control of the portion of the game image on the sub display such that the portion of the game image includes an image which is not included in the game image displayed on the main display.

According to the present invention, it is possible to diversify the player's ways of watching the game image and hence, it is possible to provide the gaming machine with high interest.

BRIEF DESCRIPTION OF THE DRAWINGS

FIG. 4A to FIG. 4C are explanatory views of an aiming position detection part, wherein FIG. 4A is a view for explaining the constitution of the aiming position detection part and FIG. 4B and FIG. 4C are views for explaining the aiming position detection processing;

FIG. 8A to FIG. 8D are explanatory views of game images, wherein FIG. 8A is a view showing one example of the game image displayed on the main display and FIG. 8B to FIG. 8D show one example of the game image displayed on the sub display.

DESCRIPTION OF THE PREFERRED EMBODIMENTS

Embodiments of the present invention are explained in conjunction with attached drawings.

Figure 1:
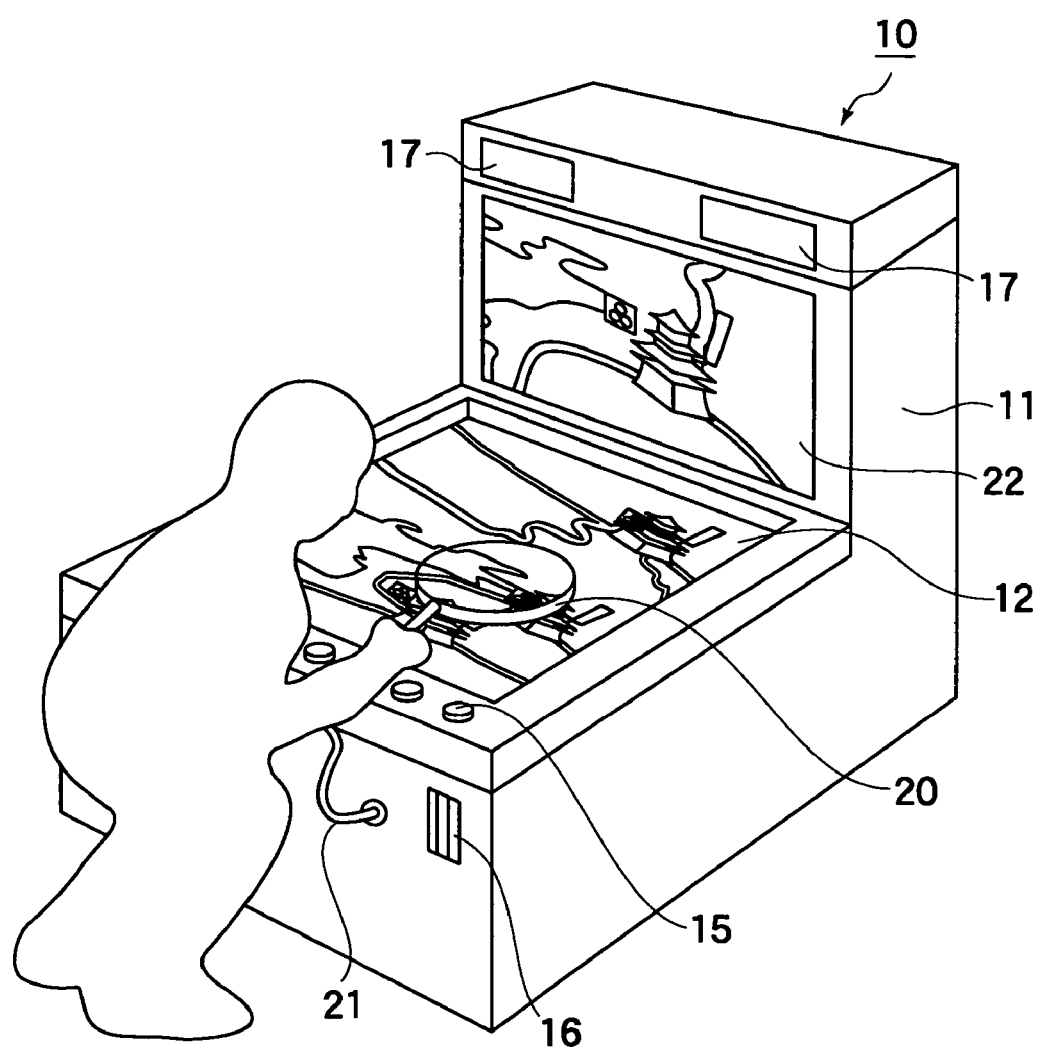
FIG. 1 is a perspective view schematically showing one example of the gaming machine of the present invention.

FIG. 1 is a perspective view which schematically shows one example of a gaming machine of the present invention.

On a center portion of an upper surface of a main body 11 of the gaming machine 10, a main display 12 which is formed of a CRT (Cathode Ray Tube) is mounted in a state that the main display 12 assumes a horizontal posture. On the main display 12, a game image corresponding to a progress state of the game or the like is displayed.

Further, on a deep end of the main display 12, a sub display 22 is mounted in an upright manner. On the sub display 22, a portion of the game image including an aiming position indicated by an aiming controller 20 described later is displayed in an enlarged manner. Further, on an upper portion of the sub display 22, two speakers 17 which are arranged in the left and right direction are mounted and BGM, sounds, sound effects and the like are outputted suitably corresponding to the progress state or the like of the game from these speakers 17.

To a cable 21 which is led out from the main body 11, the aiming controller 20 having a shape which imitates a magnifying glass is connected. The aiming controller 20 is provided for indicating the aiming position on the game image displayed on the main display 12. The aiming controller 20 is configured such that a player holds and moves the aiming controller 20 over the main display 12.

Further, to a front side of the main display 12, a manipulation button 15 is provided. The player can advance the game by pushing down this manipulation button 15. Further, on a front surface of the main body 11, a coin insertion slot 16 is formed and a coin is inserted into the coin insertion slot 16 for starting the game. In the inside of the coin insertion slot 16, a coin detector 18 is provided and a coin inserted into the coin insertion slot 16 is detected by the coin detector 18.

In the present invention, although the direction of the main display 12 is not particularly limited, as shown in FIG. 1, it is desirable that the main display 12 has the horizontal posture. This is because that the aiming controller 20 can be easily moved over the main display 12 and hence, a player can play the game for a long time without feeling fatigue or the like.

Further, although the shape of the aiming controller 20 is not particularly limited, as shown in FIG. 1, it is desirable that the aiming controller 20 has the shape which imitates the magnifying glass. This is because that such a shape gives the player a feeling as if the portion of the game image displayed on the main display 12 is displayed on the sub display 22 in an enlarged manner with the use of the magnifying glass and hence, it is possible to perform the display of the game image which is vivid and full of reality. Further, with respect to the shape of the aiming controller 20, for example, shapes which imitate binoculars, a telescope, a microscope and the like can be named.

Further, the position where the manipulation button 15 (game advancing manipulation part) is formed is not particularly limited in the present invention. However, as in the case of the gaming machine 10 shown in FIG. 1, it is desirable that the manipulation button 15 (the game progress manipulation part) 15 may be mounted on the main body 11. This is because that the player can advance the game by manipulating the manipulation button 15 mounted on the main body 11 using another hand while manipulating the aiming controller 20 using one hand and hence, the player can smoothly advance the game while watching the main display 12 or watching the sub display 22.

Here, in the present invention, it is desirable that the gaming machine 10 is provided with a magnification setting manipulation part which enables the setting of desired magnifications of the game image which is displayed on the sub display 22 in an enlarged manner. With the provision of the magnification setting manipulation part, the ways of watching the game image can be diversified. In this case, it is desirable that the magnification setting manipulation part is mounted on the aiming controller. This is because that the availability of the game manipulation can be enhanced such that while changing the direction and the position of the aiming controller with one hand, the player can manipulate the magnification setting manipulation part mounted on the aiming controller.

Figure 2:
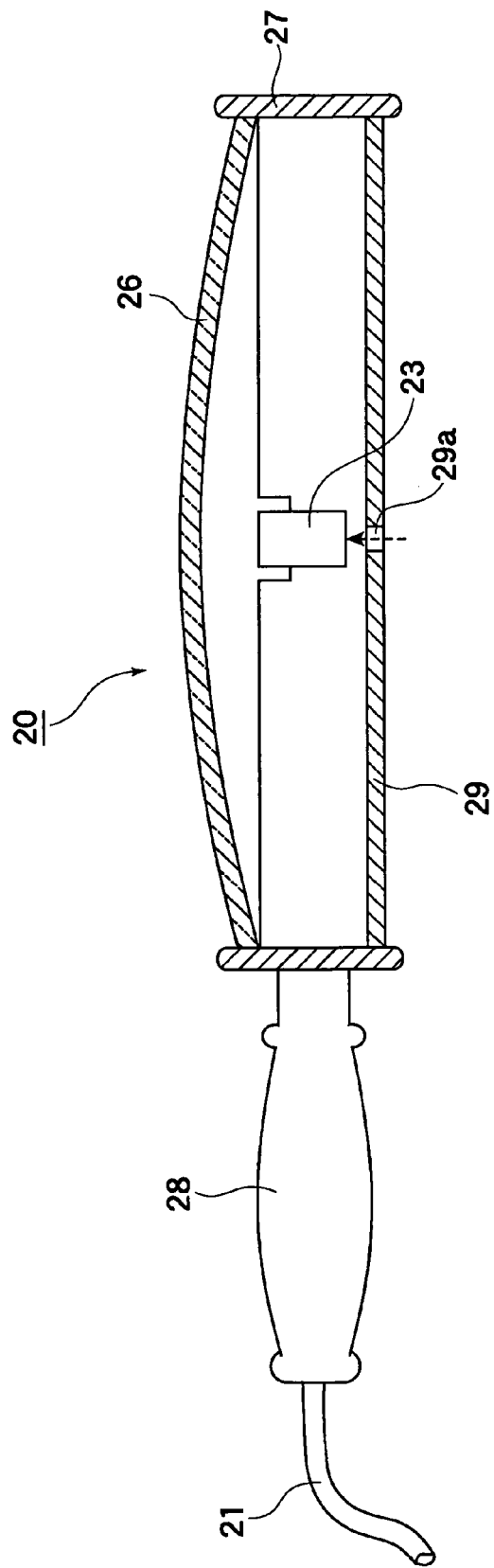
FIG. 2 is a longitudinal cross-sectional view schematically showing a aiming controller of the gaming machine shown in FIG. 1.

FIG. 2 is a longitudinal cross-sectional view which schematically shows the aiming controller 20 of the gaming machine 10 shown in FIG. 1. In the drawing, an arrow indicated by a broken line indicates a scanning light from the main display 12.

The aiming controller 20 includes a circular annular frame 27, a grip 28 which is connected to the frame 27, and an upper plate 26 and a lower plate 29 which are fitted in the frame 27 thus exhibiting the shape which imitates the magnifying glass. A photo sensor 23 is arranged between the upper plate 26 and the lower plate 29 and a lens 29a is fitted into a portion of the lower plate 29 which corresponds to the photo sensor 23.

The photo sensor 23 is configured such that the photo sensor 23 can receive the scanning light due to raster scanning of the main display 12 (not shown in the drawing) through the lens 29a and can transmit a pulse signal upon receiving the scanning light. The cable 21 connected with the grip 28 is connected with the main body 11 and the pulse signal from the photo sensor 23 is transmitted to the main body 11 though the cable 21.

Figure 3:
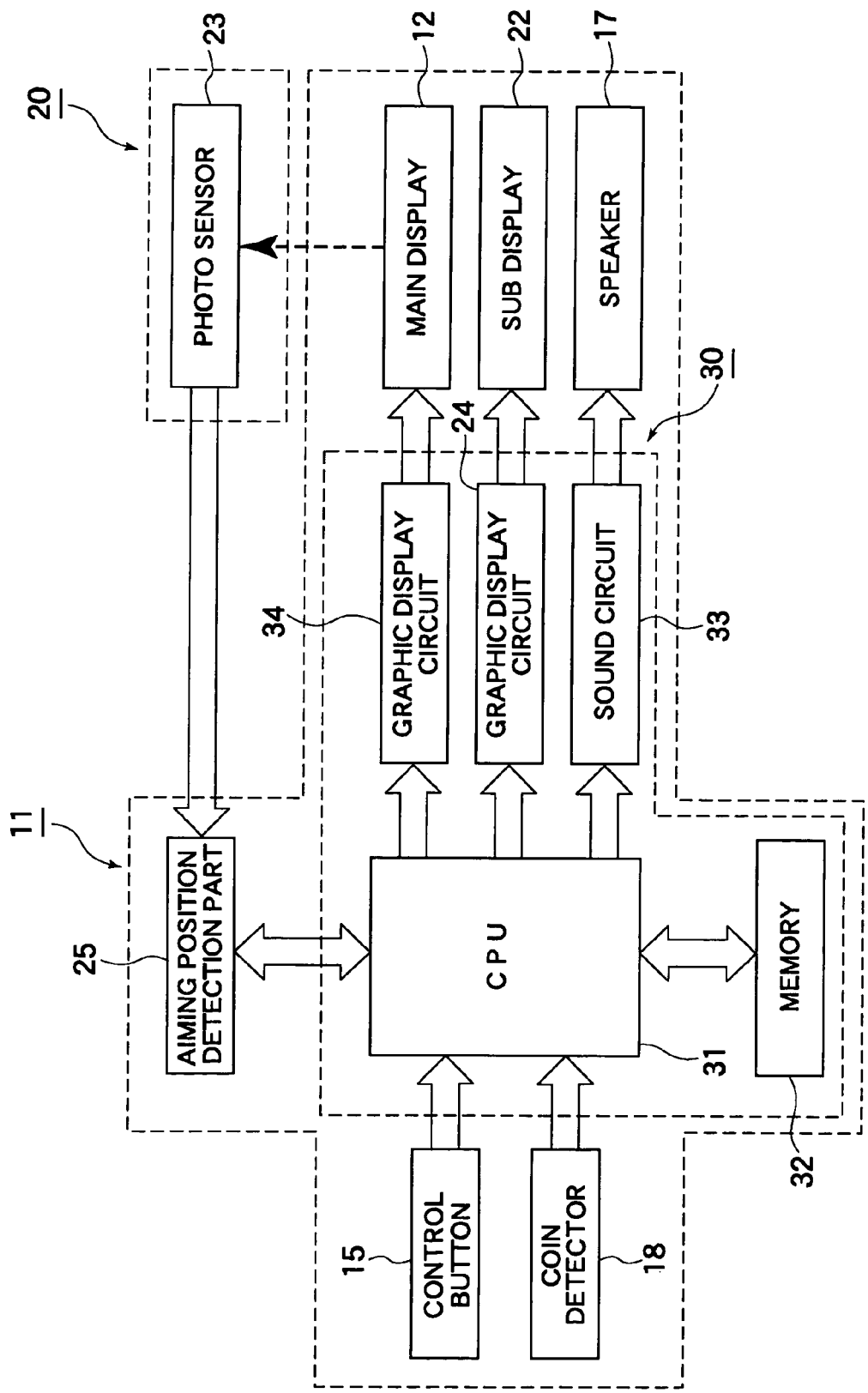
FIG. 3 is a block diagram showing the inner constitution of the gaming machine shown in FIG. 1.

FIG. 3 is a block diagram showing the inner constitution of the gaming machine 10 shown in FIG. 1.

In the inside of the main body 11 of the gaming machine 10, a control circuit 30 is provided. The control circuit 30 includes a CPU (Central Processing Unit) 31, a memory 32, a sound circuit 33 and graphic display circuits 24, 34. In the memory 32, a program related to a game control, various data including various image data which are displayed on the main display 12 and the sub display 22 and the like, for example, are stored. The sound circuit 33 is connected with the speakers 17 through a sound amplifier (not shown in the drawing). The graphic display circuit 34 makes the main display 12 display the game image based on a command (a display control command) from the CPU 31. Further, the graphic display circuit 24 makes the sub display 22 display the game image in an enlarged manner based on a command from the CPU 31.

The manipulation button 15 which is mounted on the main body 11 is connected with the CPU 31 of the control circuit 30 and supplies a manipulation signal to the CPU 31 when the player pushes down the manipulation button 15. Further, the coin detector 18 is connected with the CPU 31 and transmits a detection signal to the CPU 31 when the coin detector 18 detects a predetermined coin.

The photo sensor 23 which is mounted in the inside of the aiming controller 20 transmits a detection pulse to an aiming position detection part 25 upon receiving the scanning light (indicated by the broken line in the drawing) from the main display 12.

The aiming position detection part 25 receives the detection pulse from the photo sensor 23, a clock pulse (CLK) from the control circuit 30, and a horizontal synchronizing signal (HSYNC) and a vertical synchronizing signal (VSYNC) from the main display 12 and detects the aiming position of the aiming controller 20 based on these pulses and signals. The horizontal synchronizing signal (HSYNC) and the vertical synchronizing signal (VSYNC) may be directly received from the graphic display circuit 34 or the like or an HV separator maybe mounted in the inside of the aiming position detection part 25 and these signals maybe extracted from a video output from the graphic display circuit 34. The aiming position detection part 25 will be explained in detail later in conjunction with drawings.

Figure 4A:
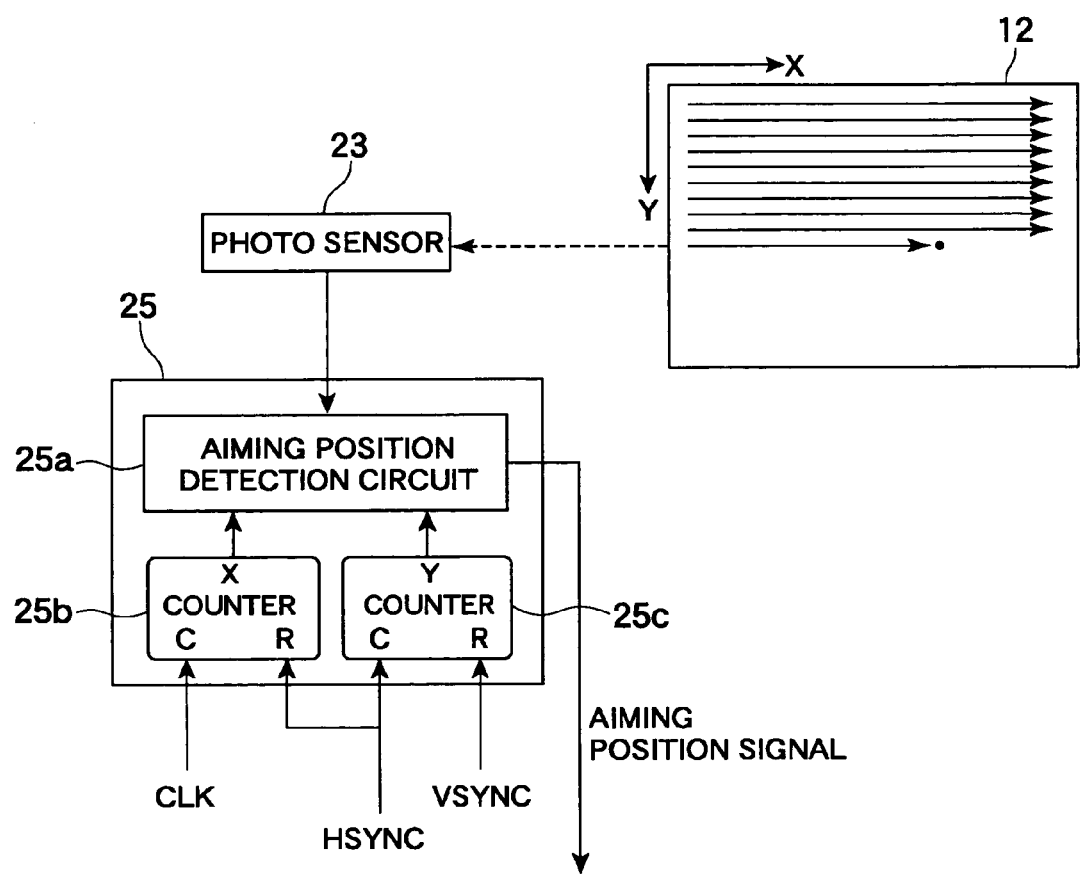
Figure 4B:
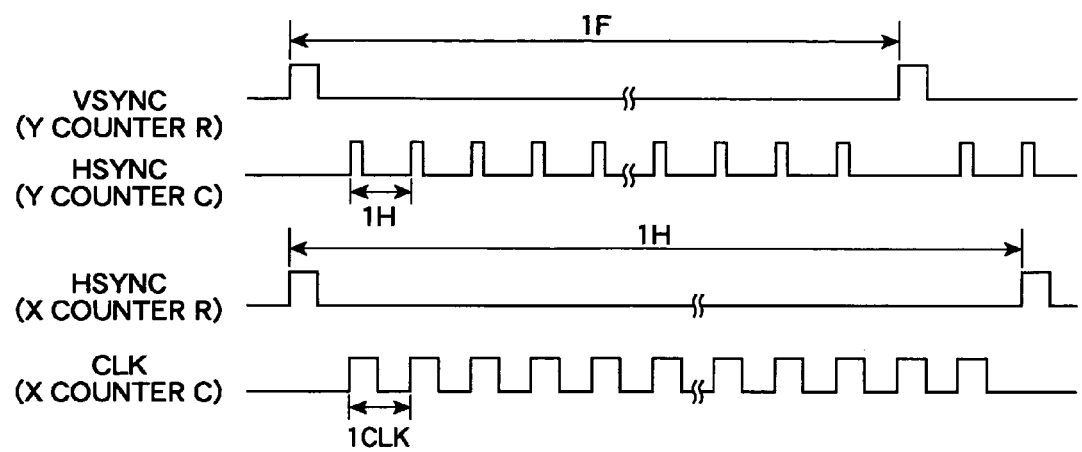
Figure 4C:
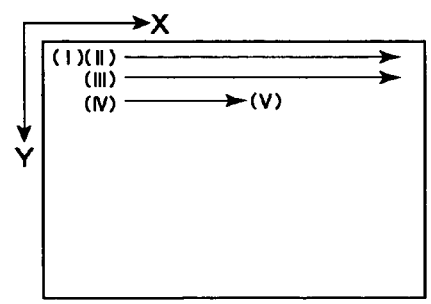

FIG. 4A is a view for explaining the constitution of the aiming position detection part 25 and FIG. 4B and FIG. 4C are views for explaining the aiming position detection processing.

The aiming position detection part 25 includes an aiming position detection circuit 25a, an X counter 25b and a Y counter 25c. The X counter 25b is provided for detecting an X coordinate of the aiming position and the Y counter 25c is provided for detecting a Y coordinate of the aiming position. The X counter 25b and the Y counter 25c are respectively provided with a reset terminal R and a clock terminal C.

The detection pulse from the photo sensor 23 is inputted to the aiming position detection circuit 25a. The clock pulse (CLK) from the control circuit 30 is inputted to the clock terminal C of the X counter 25b. The horizontal synchronizing signal (HSYNC) from the main display 12 is inputted to the reset terminal R of the X counter 25b and the clock terminal C of the Y counter 25c. The vertical synchronizing signal (VSYNC) from the main display 12 is inputted to the reset terminal R of the Y counter 25c.

Accordingly, the X counter 25b increases one count each time the clock pulse (CLK) is inputted one time and resets the count when the horizontal synchronizing signal (HSYNC) is inputted. Further, the Y counter 25c increases one count each time the horizontal synchronizing signal (HSYNC) is inputted one time and resets the count when the vertical synchronizing signal (VSYNC) is inputted.

FIG. 4B shows the relationship between the vertical synchronizing signal (VSYNC) and the horizontal synchronizing signal (HSYNC) which are inputted to the Y counter 25c and the relationship between the horizontal synchronizing signal (HSYNC) and the clock pulse (CLK) which are inputted to the X counter 25b. In the drawing, 1F indicates a display period of one screen, 1H indicates one horizontal scanning period, and 1CLK indicates a period of clock.

Due to such a constitution, the Y counter 25c is reset at a point (I) shown in FIG. 4C, that is, at an initial point of the display period of one screen. Then, the Y counter 25c increases the count for every 1H. On the other hand, the X counter 25b is reset at points (II) to (IV) shown in FIG. 4C, that is, at an initial point of one horizontal scanning period 1H. Then, the X counter 25b increases the count for every clock period 1CK.

Figure 5:
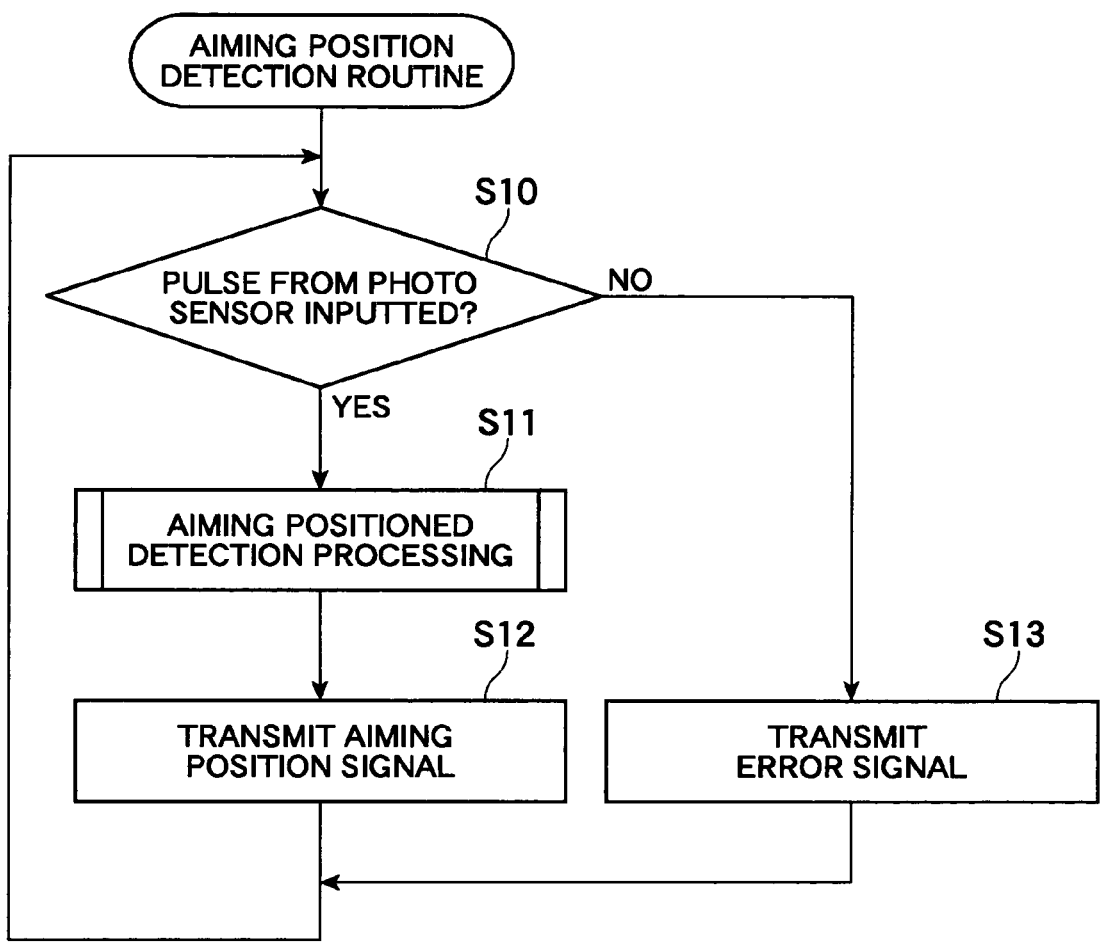
FIG. 5 is flow chart showing an aiming position detection routine in an aiming position detection circuit.

FIG. 5 is a flow chart showing an aiming position detection processing routine in the aiming position detection circuit 25a.

First of all, it is determined whether the detection pulse from the photo sensor 23 is inputted to the aiming position detection circuit 25a or not (step S10). When the raster scanning of the main display 12 is performed on the aiming position of the aiming controller 20 (not shown in the drawing) on the main display 12, the scanning light is detected by the photo sensor 23 and the detection pulse is transmitted to the aiming position detection circuit 25a. The aiming position detection circuit 25a determines whether the detection pulse is received or not.

When the detection pulse is inputted to the aiming position detection circuit 25a, the aiming position detection circuit 25a obtains the count values from the X counter 25b and the Y counter 25c and detects the X coordinate and the Y coordinate of the aiming position based on these counter values (step S11). Thereafter, the aiming position detection circuit 25a transmits the aiming position signal to the control circuit 30 (step S12).

On the other hand, when it is determined that the pulse signal from the photo sensor 23 is not inputted to the aiming position detection circuit 25a, this implies that the aiming controller 20 does not indicate the aiming position on the game image of the main display 12, that is, the aiming controller 20 is not directed to the main display 12. Accordingly, the aiming position detection circuit 25a transmits an error signal to the control circuit 30 (step S13). When the processing in step S12 or S13 is executed, the processing is made to return to step S10 and the above-mentioned processing are repeatedly executed. As a result, the aiming position signal or the error signal is intermittently transmitted to the control circuit 30. Here, the photo sensor 23 and the aiming position detection part 25 function as aiming position detection means which detects the aiming position on the game image indicated by the aiming controller 20.

The main display in the present invention is not particularly limited and may be formed of the CRT or an LCD. Further, a display method of the main display is not particularly limited and may be an interlace method or a progressive method, for example. Further, the brightness of the main display is not particularly limited provided that the scanning light from the main display can be surely received by the photo sensor.

Further, in the present invention, the method for detecting the aiming position of the aiming controller is not particularly limited to the above-mentioned examples. For example, a sensor which measures the direction and/or position of the aiming controller may be provided and the aiming position may be detected based on a measured result obtained by the sensor.

Figure 6:
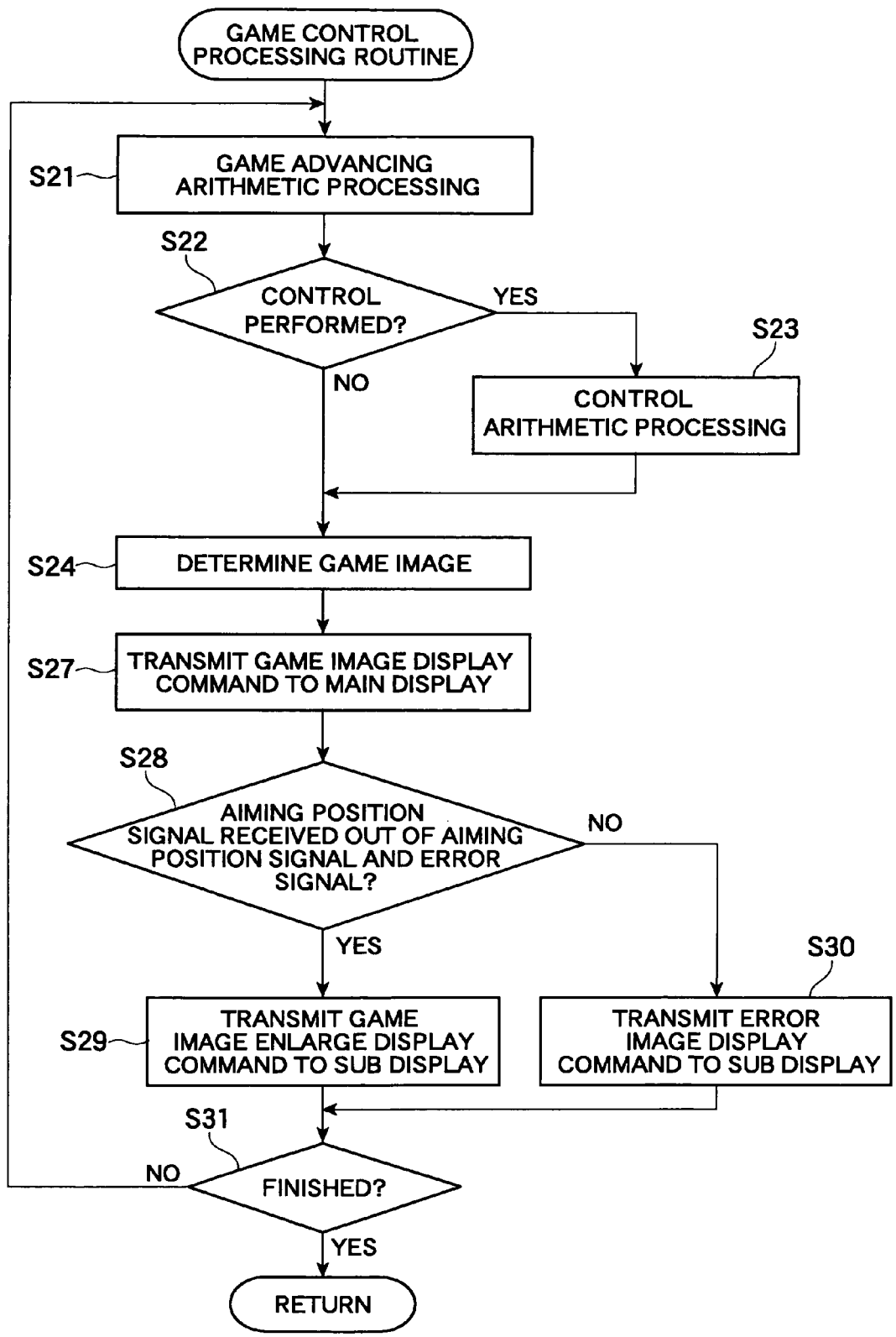
FIG. 6 is a flow chart showing the game control processing routine executed by a control circuit.

FIG. 6 is a flow chart showing a game control processing routine which is executed by the control circuit 30. Hereinafter, the explanation is made with respect to a case in which the game is in progress.

First of all, the CPU 31 performs the game advancing arithmetic processing (step S21). In this processing, the arithmetic processing related to the game advancing such as changes of various parameters related to the game and the decision of scenes or characters which are displayed as game images is performed.

Next, the CPU 31 determines whether the manipulation button 15 is manipulated or not (step S22). That is, the CPU 31 determines whether a manipulation signal from the manipulation button 15 is detected or not.

When the CPU 31 determines that the manipulation button 15 is manipulated, the CPU 31 performs the manipulation arithmetic processing (step S23). In this processing, corresponding to the manipulation content, the arithmetic processing related to the game advancing such as the change of respective parameters related to the game, the decision of the scenes and characters which are displayed as the game image is performed.

When the CPU 31 determines that the manipulation button 15 is not manipulated in step S22, or the CPU 31 executes the processing of step S23, the CPU 31 performs the processing to determine the game image to be displayed on the main display 12 (step S24). This processing is performed based on the result of processing in the above-mentioned step S21 and step S23.

Next, the CPU 31 transmits a command to display the game image on the main display 12 to the graphic display circuit 34 (step S27). Upon receiving the above-mentioned command, the graphic display circuit 34 generates the game image corresponding to the command and allows the main display 12 to display this game image.

Here, the graphic display circuit 34 functions as first display control means which performs the display control of the game image on the main display 12.

Next, the CPU 31 determines which signal the CPU receives out of the aiming position signal and the error signal from the aiming position detection part 25 (step S28) These aiming position signal and error signal are supplied to the control circuit 30 when the subroutine described in FIG. 5 is executed in the aiming position detection circuit 25a.

When the CPU 31 determines that the CPU 31 receives the aiming position signal from the aiming position detection part 25, the CPU 31 transmits a command to display a portion of the game image on the sub display 22 in an enlarged manner to the graphic display circuit 24 (step S29). Here, this processing is explained in conjunction with FIG. 7.

Figure 7:
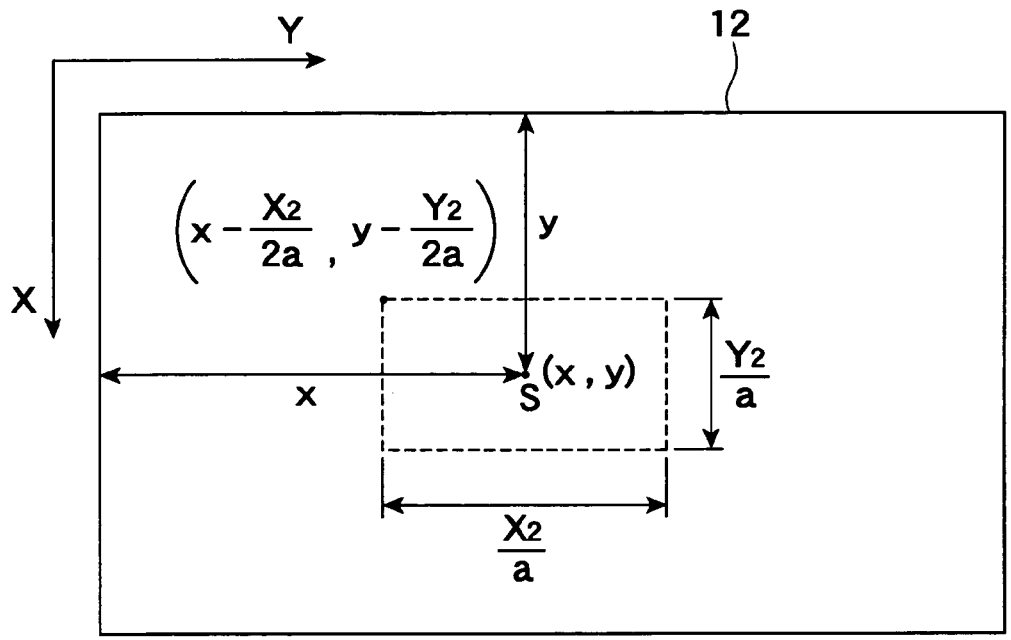
FIG. 7 is a view for explaining the processing according to a display control on a sub display.
Figure 7:
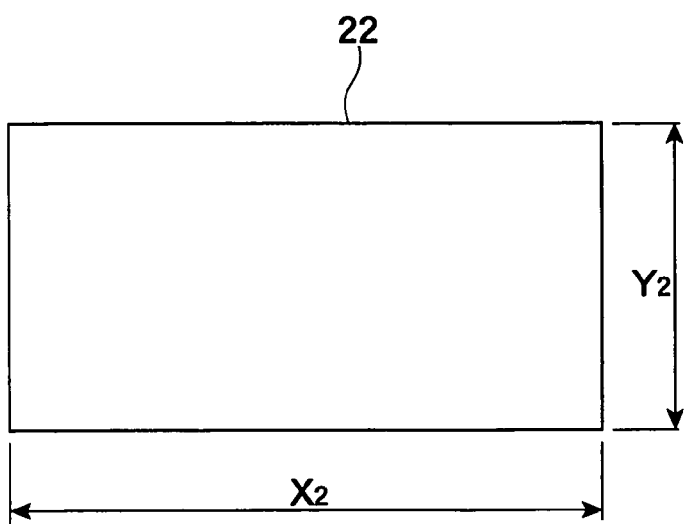

FIG. 7 is a view for explaining the processing related to the display control applied to the sub display 22. Here, the magnification is preliminarily set to a times and an area of the display region of the sub display 22 is set to $X_2 \times Y_2$.

When the coordinates of the aiming position S in the main display 12 is (x, y), the coordinates of a reference point (a point at a left upper portion) of the game image displayed on the sub display 22 is $(x-X_2/2a, y-Y_2/2a)$ and hence, the game image which is included in the region having an area $(X_2/a) \times (Y_2/a)$ from the reference point (a rectangular region indicated by a broken line in the drawing) constitutes the game image which is displayed on the sub display 22. In step S29 of the subroutine shown in FIG. 6, the CPU 31 transmits a command which enlarges the game image in the inside of the rectangular region indicated by a broken line "a" times and makes the sub display 22 display the enlarged game image to the graphic display circuit 24. The graphic display circuit 24 which receives the above-mentioned command generates the game image corresponding to the command and makes the sub display 22 display the game image. As a result, in the sub display 22, a portion of the game image including the aiming position is displayed in an enlarged manner with predetermined magnifications. Here, the graphic display circuit 24 functions as the second display control means which performs the enlarged display of the portion of the game image on the sub display 22.

On the other hand, when the CPU 31 does not receive the aiming position signal in step S28, the CPU 31 determines that the CPU 31 receives an error signal from the aiming position detection part 25 and hence, the CPU 31 transmits a command to the graphic display circuit 24 thus allowing the sub display 22 to display an error image that the aiming controller 20 is not directed to the main display 12 (step S30).

After executing the processing of step S29 or step S30, the CPU 31 determines whether the game is to be finished or not (step S31). When the determination is made not to finish the game, the processing is made to return to the step S21 and the above-mentioned processing is repeated. On the other hand, when the CPU 31 determines that the game is to be finished this sub routine is completed.

Next, one example of the game which is performed by the gaming machine of this embodiment is explained along with the game image.

Figure 8A:
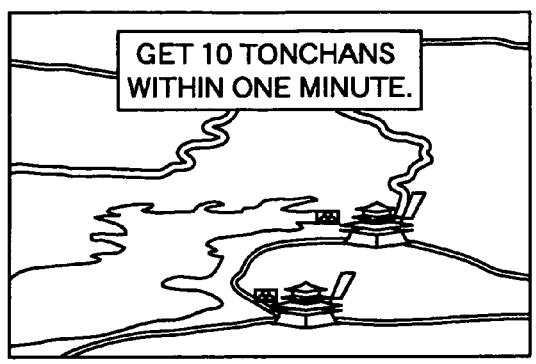
Figure 8B:
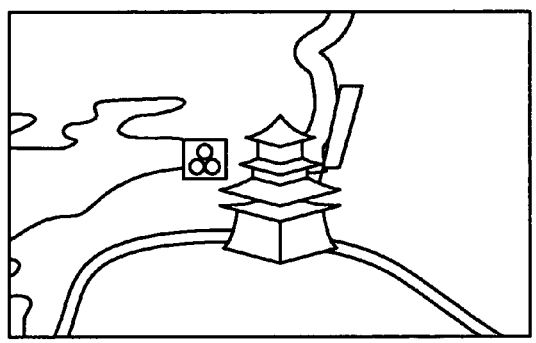
Figure 8C:
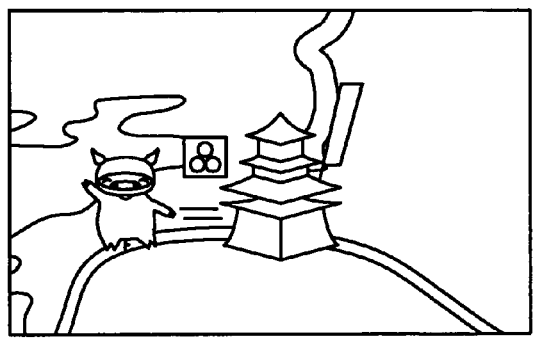
Figure 8D:
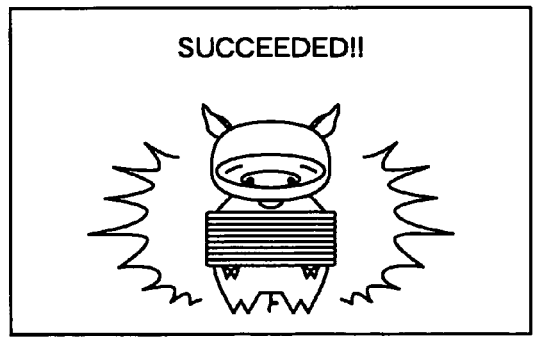

FIG. 8A is a view showing one example of the game image displayed on the main display 12, while FIG. 8B to FIG. 8D are views showing one example of the game image displayed on the sub display 22. Here, this game is a game which aims at catching a predetermined number of tonchans who are ninjas running about to escape throughout the country within a limit time.

In the game image shown in FIG. 8A, the image indicating the purpose of game, "get 10 tonchans within one minute!!" is displayed and, at the same time, an image of a bird-eye view of one country in the age of wars is displayed. In the game image displayed on the main display 12, the tonchans are not displayed. Accordingly, the player has to search the tonchans from the game image which is displayed in an enlarged manner on the sub display 22 using the aiming controller 20.

The game image shown in FIG. 8B is the game image displayed on the sub display 22, wherein the portion of the game image displayed on the main display 12 (see FIG. 8A) is displayed in an enlarged manner with a preset predetermined magnifications. However, also in the inside of this game image, the tonchans are not displayed. Accordingly, the player has to search for the tonchans by moving the aiming controller 20 or by changing the direction of the aiming controller 20.

Thereafter, when the player succeeds in getting the tonchan, as shown in FIG. 8C, the game image showing a state that the tonchan runs out from a castle is displayed. When the player pushes manipulation button 15 in a state that the tonchan is displayed, as shown in FIG. 8D, the image "Succeeded" is displayed and at the same time, a mode that the tonchan is caught is displayed. Here, the player has succeeded in getting one tonchan.

According to the present invention, as can be understood from the above-mentioned embodiment, it is desirable that the enlarged display of the portion of the game image is performed on the sub display 22 (see FIG. 8C, FIG. 8D) in a state that the image (the character image showing tonchans) which is not included in the game image displayed on the main display 12 (see FIG. 8A) is included in the game display which is performed on the sub display 22. This is because that, with such a provision, the diversified ways of watching the game image and the game contents can be closely associated with each other and hence, the further enhancement of the interest can be realized.

According to the gaming machine 10, the usual game image is displayed on the main display 12, while the portion of the game image which contains the aiming position indicated by the aiming controller 20 is displayed in an enlarged manner on the sub display 22. Accordingly, as explained in conjunction with the example shown in FIG. 8, the player can advance the game while watching the main display 12 (see FIG. 8A) and can manipulate the aiming controller 20 depending on the current state of the progress of game so as to display in an enlarged manner the arbitrary portion of the game image which the player particularly want to watch in the sub display 22 (see FIG. 8B and FIG. 8C) whereby the player's ways of watching the game can be diversified. As a result, it is possible to provide the gaming machine which exhibits the high interest.

Further, it is possible to apply the present invention to a gaming system which is constituted of a main body on which a TV receiver set which functions as the main display and the sub display are mounted and the aiming controller. In this case, the main body functions as the first display control means and the second display control means, while the main body and the aiming controller function as the aiming position detection means.

According to the invention having the above-mentioned constitution, the usual game image is displayed on the main display and a portion of the game image including the aiming position indicated by the aiming controller is displayed on the sub display in an enlarged manner. Accordingly, for example, a player advances the game while watching the main display and, depending on the progress condition of the game, the player manipulates the aiming controller so as to display a portion which the player arbitrarily wants to watch in the game image on the sub display in an enlarged manner. Accordingly, the manner that the player watches the game image can be diversified. As a result, it is possible to provide the gaming machine with high interest.

According to the invention having the above-mentioned constitution, the main display assumes the horizontal posture and hence, it is possible to easily move the aiming controller over the main display whereby the player feels less fatigue or the like and can play the game for a long time.

According to the invention having the above-mentioned constitution, it is possible to impart the player a feeling as if a portion of the game image displayed on the main display is displayed on the sub display in an enlarged manner using the magnifying glass whereby it is possible to perform the display of the game image which is vivid and full of reality.

According to the invention having the above-mentioned constitution, the image which is not displayed on the main display is present and the player cannot watch such an image unless the image is not displayed on the sub display using the aiming controller. Accordingly, for example, the game is usually advanced based on the game image displayed on the main display and, when a specific event takes place, it is necessary to advance the game based on the image displayed on the sub display using the aiming controller and hence, it is possible to make the diverse ways of watching the game image and the content of the game closely related with each other. As a result, the interest of playing the gaming machine is further enhanced.

What is claimed is:

1. A gaming machine comprising:
    a main body including a main display on which a game image is displayed which is arranged in a substantially horizontal posture and a sub display on which a portion of the game image is displayed in an enlarged manner and which is arranged contiguously with the main body;
    an aiming controller being configured to be movable over the main display and indicating an aiming position on the game image displayed on the main display;
    first display control device performing a display control of the game image on the main display;
    aiming position detection device detecting the aiming position on the game image indicated by the aiming controller; and
    second display control device performing an enlarged display control of a portion of the game image on the sub display such that the portion of the game image includes the aiming position detected by the aiming position detection device.

2. A gaming machine according to claim 1, wherein the aiming controller is constituted as a magnifying glass.

3. A gaming machine according to claim 1, wherein the second display control device performs the enlarged display control of the portion of the game image on the sub display such that the portion of the game image includes an image which is not included in the game image displayed on the main display.

4. A gaming machine according to claim 1, wherein the aiming position detection device detects the aiming position on the game image indicated by the aiming controller based on the measured result obtained by the sensor for measuring direction and/or position of the aiming controller.

5. A gaming machine according to claim 1, wherein the sub display is arranged in a vertical posture.

6. A gaming machine according to claim 1, wherein the sub display is mounted on a deep end of the main display in an upright manner.

* * * * *